Figure 1:
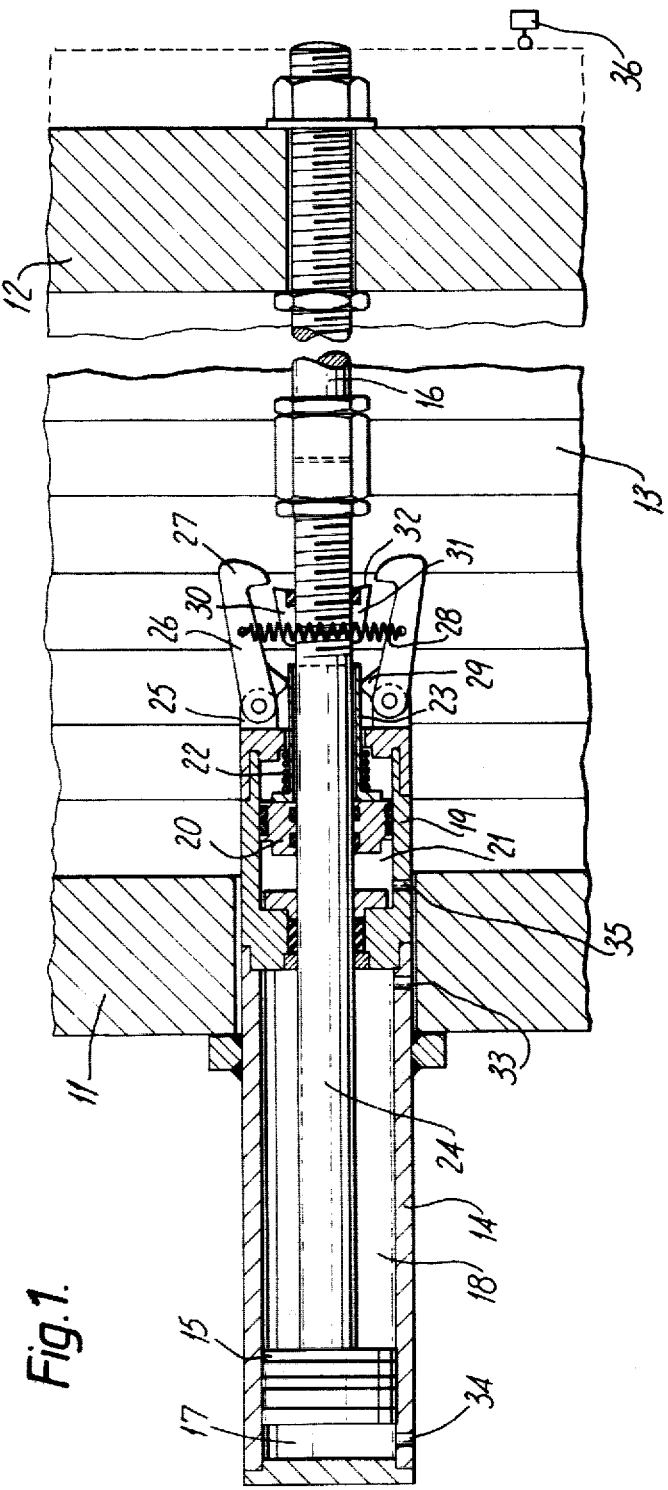

United States Patent [19]

Jones

[11] 4,343,235
[45] Aug. 10, 1982

[54] FILTER PRESSES

[75] Inventor: Paul F. Jones, Newcastle-Under-Lyme, England

[73] Assignee: Johnson-Progress, Ltd., Stoke-On-Trent, England

[21] Appl. No.: 117,335

[22] Filed: Jan. 31, 1980

[30] Foreign Application Priority Data

Jan. 31, 1979 [GB] United Kingdom ............... 7903411

[51] Int. Cl.³ .................... B30B 7/00; B30B 15/10
[52] U.S. Cl. ................................ 100/204; 100/219; 100/48; 210/230
[58] Field of Search ............... 100/43, 48, 219, 193, 100/196, 197, 198, 199, 204, 219; 210/224, 225, 226, 227, 228, 229, 230

[56] References Cited

U.S. PATENT DOCUMENTS

| | | | |
|---|---|---|---|
| 942,173 | 12/1909 | Heller | 210/230 |
| 3,667,891 | 6/1972 | Gelin | 100/219 |
| 4,230,572 | 10/1980 | Hirs | 210/230 X |

FOREIGN PATENT DOCUMENTS 1345064  1/1974  United Kingdom

Primary Examiner—Peter Feldman
Attorney, Agent, or Firm—Howard L. Rose

[57] ABSTRACT

A plate type filter press, which is opened and closed by at least one hydraulic piston-and-cylinder unit, has a mechanical lock to lock the press in the closed position so that it is not necessary to maintain a high hydraulic pressure to keep the press closed. The mechanical lock may be a set of claws on the hydraulic cylinder to co-operate with a locking ring on the piston rod, with a hydraulic lock cylinder to retract the claws for unlocking, or a lock gate that is introduced into or retracted out of the path of a lock collar on the piston rod by operation of a lock cylinder. The press is first closed with a predetermined high hydraulic pressure that compresses the filter press pack sufficiently for easy movement of the mechanical lock into locking position, and then operation of a lock limit switch automatically stops the hydraulic pump and energizes a bleed valve to reduce the closing pressure to a level at which the press pack compression is relaxed enough to give firm lock engagement.

4 Claims, 3 Drawing Figures

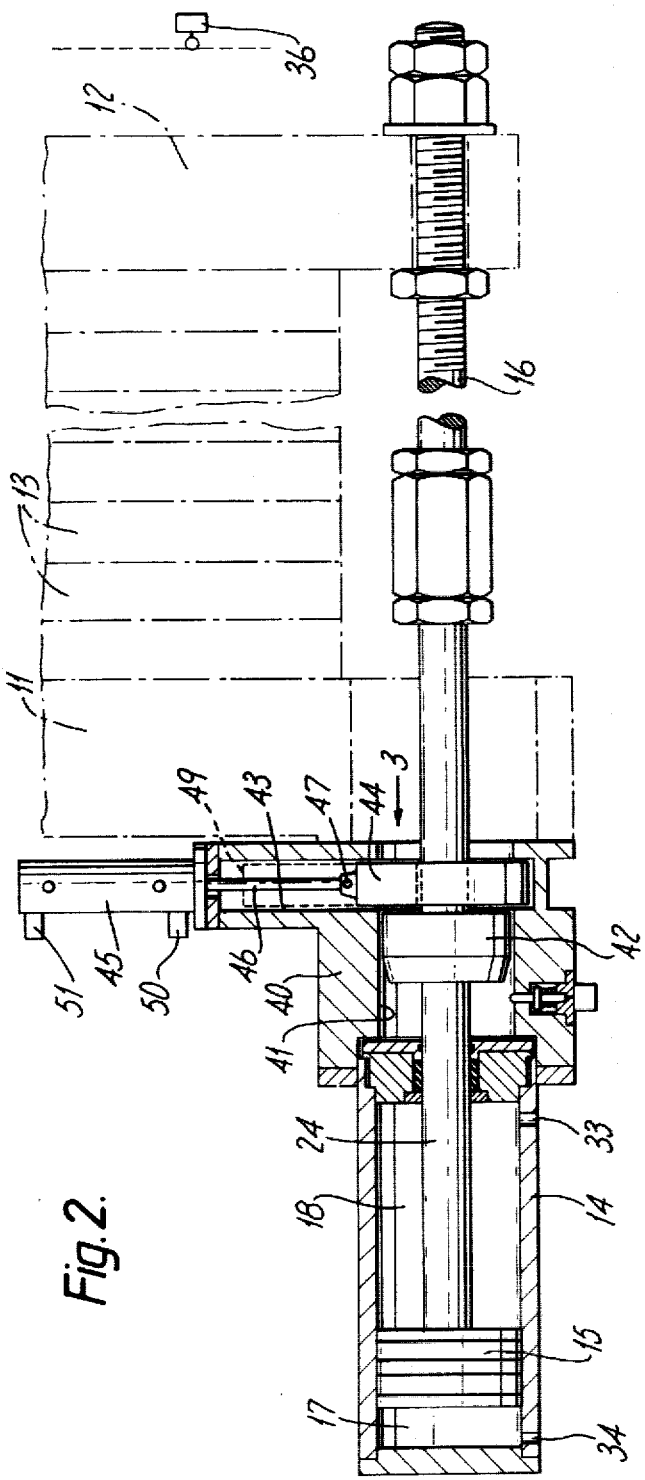
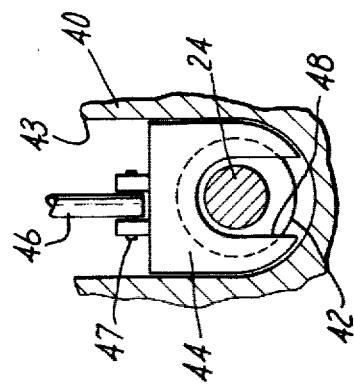

FILTER PRESSES

This invention relates to filter presses. More particularly, it is concerned with filter presses in which the pack of plates is opened and closed by a "pull to close" hydraulic system.

In conventional double acting "pull to close" systems the closure and sealing of the press depends upon maintaining hydraulic pressure in the closing or pressurised end of the hydraulic cylinder. In practice, a small amount of oil leakage tends to occur through piston seals, valvage and pipework and this leakage increases as the moving parts become worn in service. This leakage is accompanied by an hydraulic pressure drop which, if not counteracted, could allow the press to open due to the internal pressure of the medium being filtered and the release of the strain energy from the initial compression of the filter plate pack. To maintain press closure, in the conventional hydraulic system pressure drops are sensed by transducers monitored by a control unit and the closing pressure is restored periodically.

Such a system is not fully secure and can cause operational problems, as for example:

(a) Leakage of the medium being filtered from the press; loss of product.

(b) Health and safety hazard to persons who may be in the vicinity of the press leakage.

(c) Relatively high rate of oil leakage in the hydraulic system leading to frequent cut in of the hydraulic pump or frequent operation of control valves, which may cause pump or valve breakdown and excessive maintenance.

In addition to the problems of pressure drop, leakage within a continually pressurised hydraulic system can also cause problems due to gradual pressure build-up in certain regions of the system.

The principal object of the present invention is to provide mechanical security for the press after the closing has been accomplished hydraulically.

According to the invention, a filter press is provided with a mechanical lock which engages automatically when the press is closed, to hold the press closed without the need for hydraulic pressure, and fluid-operated means pressurised to release the lock when the press is to be opened.

In one embodiment, a filter press with a "pull to close" hydraulic operating system, for example as described in our British patent application No. 7904285, filed Feb. 7, 1979, comprises at least one main fluid-operated piston-and-cylinder unit mounted at one end of the press pack with a piston rod coupled to a tie rod that extends to the opposite end of the press pack and is connected thereto to exert opening and closing effort thereon, a locking fluid-operated piston-and-cylinder unit mounted on one end of the main cylinder and through which the piston rod slidingly passes, locking levers pivotally mounted on the exterior of the locking cylinder and cooperating with a locking ring on the piston rod to lock the press mechanically in the closed position, and cam means actuatable by sliding of the piston in the lock cylinder to cam the lock levers out of engagement with the locking lever and unlock the press.

In another embodiment, the lock comprises a lock collar fast on the piston rod of the piston-and-cylinder unit that effects opening and closing of the press, and a lock gate that is moved in a direction at right angles to the axis of the piston rod by a lock piston-and-cylinder into and out of the path of the collar on the rod.

When the mechanical locking means is engaged the hydraulic system may be shut down automatically until the press requires to be opened.

Arrangements according to the invention will now be described, by way of example, with reference to the accompanying drawings, in which:

FIG. 1 shows, in diagrammatic longitudinal section, a hydraulic piston-and-cylinder unit, for opening and closing a filter press, equipped with one form of mechanical lock, FIG. 2 is a similar longitudinal section showing another form of mechanical lock, and FIG. 3 is a view of the lock in the direction of the arrow 3 of FIG. 2.

Referring firstly to FIG. 1, this shows the king end 11 and queen end 12 of a filter press with the pack of filter plates 13 between. Mounted on the king end is a main hydraulic piston-and-cylinder unit 14 the piston 15 of which has a piston rod 24 coupled to a tie rod 16 that extends longitudinally of the press and is connected to the queen end. To open the press low hydraulic pressure is admitted to the left hand chamber 17 of the cylinder 14 while the press is closed by admitting high pressure to the right hand chamber 18.

At the inner right hand end of the main cylinder 14 there is secured a lock cylinder 19 containing a lock piston 20. The main piston rod 24 passes through the lock cylinder and through a bore in the lock piston which is arranged to slide freely along the rod. The lock piston 20 can be driven to the right by the admission of low pressure fluid to the left hand chamber 21 of the lock cylinder and it returns leftwards, when the fluid pressure is released, under the action of a return spring 22. When the lock piston 20 moves, it is accompanied by a bushing 23 that also surrounds the piston rod 24 and extends out through the right hand end of the lock cylinder 19.

On the exterior of the right hand end of the lock cylinder are lugs 25 on which are pivotally mounted a set of lock levers 26 that extend from the pivots to the right roughly parallel to the piston rod 24 and have inturned detent portions 27 on their right hand ends. Springs 28 pull the lock levers in toward one another. On the insides of the lock levers 26 near the pivots there are cam portions 29 to co-operate with the sliding bushing 23 that moves with the lock piston. A locking ring 30 fast on the piston rod 24 co-operates with the lock lever detents 27; this locking ring has an easy taper 31 in the left hand direction toward the lock cylinder, while at its right hand end it has a steep frusto-conical abutment face 32.

The drawing shows the apparatus in the "ready to open" position with the locking levers unlocked. To open the press, the hydraulic pressure in chamber 18 is exhausted via port 33 and low pressure oil is admitted to chamber 17 via port 34. Low pressure oil is maintained in chamber 21 of the lock cylinder via port 35 so that the lock piston 20 is held at the right hand end of its travel against the action of the spring 22 in which position the cams 29 on the lock levers engage the bushing 23 so that the locking levers 26 are held out in the unlocked position shown.

The main piston 15 moves toward the right together with the locking ring 30 the tie rod 16 and the queen end 12 of the filter press. This movement continues until the main piston 15 has reached the extremity of its travel and the press is fully open. On reaching the fully open position the queen end of the filter press operates a press open limit switch 36 which terminates the hydraulic supply to port 34 and port 35. As the pressure in the lock cylinder chamber 21 decays the lock piston 20 and the bushing 23 move back to the left under the action of the return spring 22. As the bushing 23 moves back it withdraws from the cams 29 and the locking levers 26 are pulled in under the action of the lock springs 28.

To close the press, high pressure oil is admitted to the right hand chamber 18 of the main cylinder via port 33 and the main piston with its attachments moves back to the left, the press thus commencing its closing movement. As the closing travel continues, the locking ring 31 eventually comes into contact with the locking detents 27 on the levers 26. By virtue of the taper 31 of the locking ring and the shape of the detents 27, further closing travel allows the locking ring to ride through within the levers 26 whilst at the same time opening out the levers against the tension of the springs 28. The final closing movement positions the locking ring 30 beyond the detents 27 such that the levers 26 are pulled in by the springs 28.

The hydraulic oil supply to the main cylinder port 33 is then shut off and the press becomes temporarily hydraulically locked, the contact faces of the locking detents 27 and the locking ring 30 being at this point slightly apart. With the hydraulic supply now terminated, the main piston with its attachments begins to creep to the right by virtue of leakages in the hydraulic system and some release of strain energy contained in the previously compressed filter plate pack. The very small clearance between the contact faces of the locking detents and the locking ring is therefore taken up and a firm engagement between these components is achieved. The press is now mechanically locked and remains in this state until the press requires to be opened.

It is not necessary to replenish oil leakage since the main piston and its attachments cannot move in the opening direction and the forces tending to open the press are reacted solely via the mechanical lock into the main cylinder 14 and its mounting flange.

Before unlocking can be performed it is necessary to release the firm engagement between the locking detents and the locking ring. The hydraulic system is restarted and high pressure oil is admitted to the main cylinder chamber 18 via port 33. The main piston with its attachments moves slightly to the left to give a clearance between the contacting faces of the detents and the locking ring. Whilst maintaining the high pressure oil supply to port 33, the low pressure oil supply is admitted to the lock cylinder chamber 21 via port 35. The lock piston 20 together with the bushing 23 moves to the right and the bushing 23 engages with the lock cams 29 so that levers 26 open out against the tension in the springs 28 thus enabling the press to be opened.

The press may be equipped with one or more opening, closing and locking assemblies as shown, according to requirements. Also modifications are possible without departing from the scope of the invention. Thus, although the lock piston-and-cylinder is described as single-acting with spring return, it could instead be a double-acting hydraulic unit.

Referring now to FIGS. 2 and 3, the piston-and-cylinder unit 14 for opening and closing the press is again mounted on the king end 11 of the press, with a lock housing 40 interposed between the cylinder and the king end. The lock housing has a large diameter horizontal bore 41 in alignment with the piston-and-cylinder unit 14 through which the piston rod 24 passes, and a lock collar 42 fast on the piston rod enters the bore 41 when the press is closed. Close to the king end 11, the bore 41 is intersected by a guide channel 43 in the lock housing, in which a lock gate 44 slides in a direction at right angles to the axis of the piston rod. The lock gate is operated by a hydraulic double-acting lock piston-and-cylinder unit 45 which has a piston rod 46 pivotally coupled to the gate 44 at 47. The gate 44 has, when seen in the direction of the axis of the piston rod 24, a configuration like an electrical spade terminal, with a slot 48 slightly wider than the diameter of the rod 24. The gate 44 is movable by the hydraulic unit 45 between a retracted position, indicated in broken lines at 49, in which it is withdrawn from the piston rod 24 and is away from the path of the collar 42, and a locking position, shown in full lines, in which its slotted spade configuration embraces the piston rod 24 and lies in the path of the collar 42.

The press is closed by admission of hydraulic fluid under pressure to the cylinder chamber 18 and, while the press pack is closing and compressing, the lock collar 42 enters the lock housing bore 41 and passes slightly beyond the guide channel 43 into the position shown in FIG. 2. The pressure employed for full closing of the press is 3000 p.s.i. Hydraulic pressure is admitted to the lock cylinder 45 to move the lock gate 44 into locking position behind the collar 42. On completion of the lock cylinder movement a limit switch 50 is closed and as a consequence the hydraulic pump is stopped and a bleed valve is energised to allow a small quantity of hydraulic fluid to bleed out of the cylinder chamber 18. The press closing pressure decays down to 1000 p.s.i. which allows the lock collar 42 to move back slightly and engage the gate 44. When the press closing pressure reaches 1000 p.s.i. the bleed valve is closed. The press is then mechanically locked but backed by a cushion of hydraulic fluid at 1000 p.s.i. in the closing cylinder 14.

For opening of the press, the hydraulic pump is restarted and the pressure in the cylinder chamber 18 is increased. The grip between the lock collar 42 and the gate 44 is therefore relaxed so that the lock can be retracted. When the lock is fully withdrawn, hydraulic pressure is admitted to the cylinder chamber 17 and exhausted from the chamber 18 to open the press. However, a limit switch 51, indicating completion of the withdrawal stroke of the lock cylinder 45, must be closed before switching of the supply of hydraulic fluid from the chamber 18 to the chamber 17 can take place to open the press.

While the locking arrangements are described with reference to a single main piston-and-cylinder unit for opening and closing the press, a filter press commonly has a number of such piston-and-cylinder units, any or all of which may be provided with locks.

I claim:

1. A plate type filter press comprising a king end, a queen end horizontally movable toward and away from the king end, a stack of horizontally movable filter plates between said king end and said queen end, a piston-and-cylinder unit operable to open and close the press, said piston-and-cylinder unit including a cylinder connected to one of said king end and said queen end and a horizontally-extending piston rod connected to the other of said king end and said queen end, a lock collar fast on said piston rod to move therewith, a lock gate movable in a direction at right angles to the axis of said piston rod into and out of the path of the lock collar, and a lock piston-and-cylinder coupled to said lock gate to move said lock gate into the path of said lock collar when the press is closed thereby to lock the press mechanically in the closed position.

2. A filter press according to claim 1, further comprising a first limit switch operated when said lock gate is placed in the path of said lock collar, and a second limit switch operated when said lock gate is withdrawn.

3. A filter press according to claim 1, wherein the piston-and-cylinder unit for opening and closing the press is mounted on the king end of the press with a lock housing disposed between its cylinder and the king end, the lock housing has a bore through which the piston rod of the opening and closing piston-and-cylinder unit passes and into which the lock collar enters when the press is closed, and the lock gate slides in a guide channel in the lock housing at right angles to said piston rod and bore.

4. A filter press according to claim 3, wherein the lock gate has a configuration, seen along the axis of the piston rod of the press-opening and closing piston-and-cylinder unit, like that of an electrical spade terminal with a slot somewhat wider than the diameter of the piston rod so that the lock gate embraces the piston rod when in the locking position.

* * * * *